Patented June 24, 1941

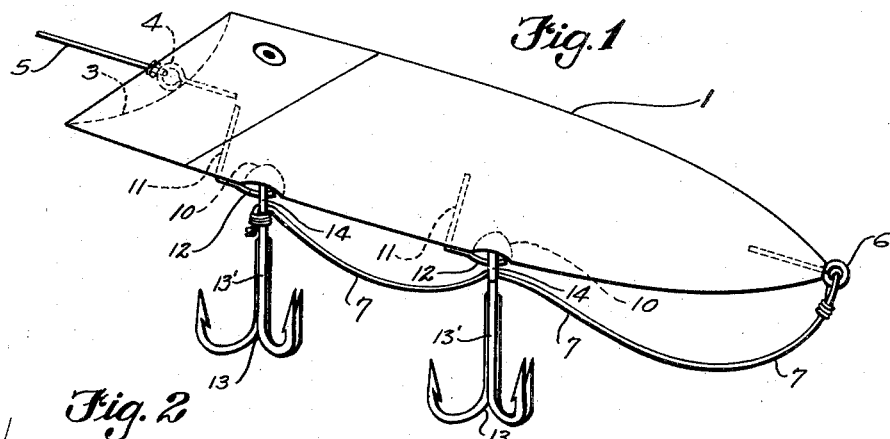
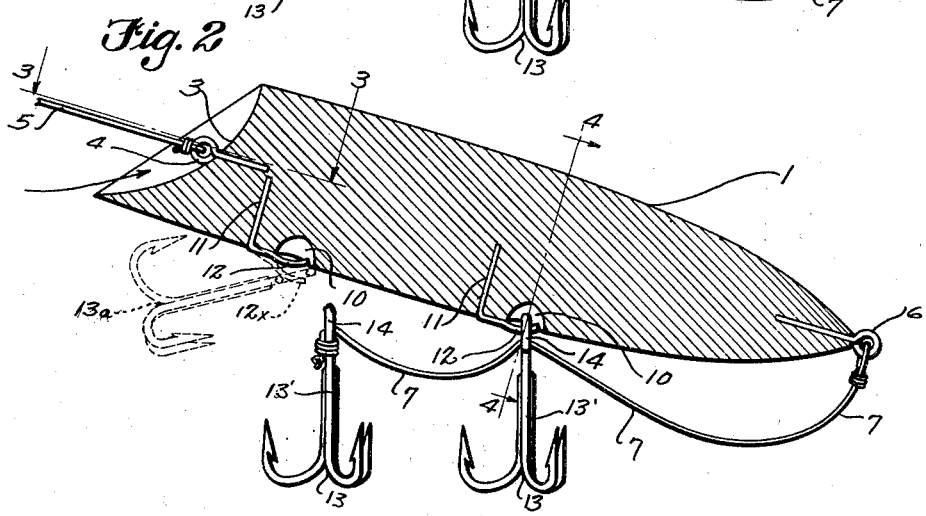
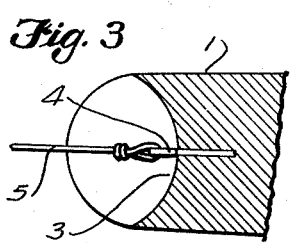
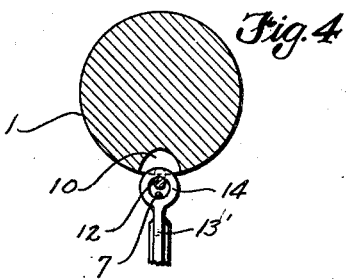
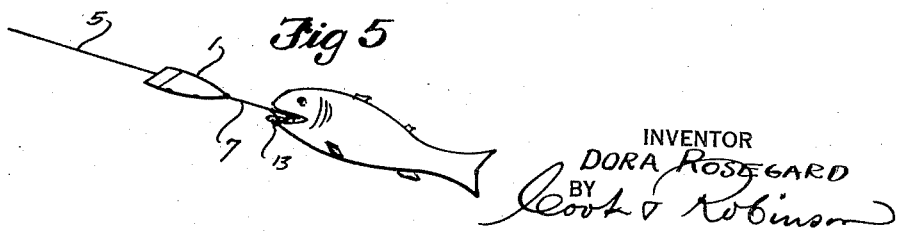

2,246,757

UNITED STATES PATENT OFFICE 2,246,757

FISH LURE

Dora Rosegard, Seattle, Wash.

Application January 13, 1940, Serial No. 313,737

3 Claims. (Cl. 43—46)

This invention relates to artificial fish bait, or fish lures, and has reference more particularly to improvements in devices of that class known as "plugs," and which are equipped at their forward end for direct attachment to the end of the fish line, or trolling line, and have a short, flexible line, or leader, secured to the rear end by which the fish hooks are carried.

It is one of the principal objects of this invention to provide a plug of the kind above identified, that is especially adapted to be used in fishing for salmon and other large game fish, and to insure an action in use of the plug that is very luring to the fish, by providing it with a downwardly and forwardly beveled front end surface, whereby the plug will be deflected downwardly on being drawn through the water as in trolling, and to so concave this beveled surface that the plug will be caused to travel with an erratic, darting action that differs from the action of other plugs, such as that of the patent of Stolley, No. 2,102,492, or that of the patent to Martin, No. 2,110,382.

It is also an object of this invention to provide means on the plug body for the releasable retention thereon of a plurality of sets of fish hooks, and to so thread these sets of hooks onto the leader that, incident to a fish being caught on any hook, all sets of hooks will be pulled free from the plug body and will slide to the end of the leader, thus to avoid any possibility of the fouling of the line or leader with the plug or the fish hooks while the fish is being landed.

A further object of the present invention resides in the provision of a novel and effective means for releasably suspending a set of hooks from the body of the plug, and which is of a character that makes possible the easy application of the hooks thereto and an easy detachment from the plug by a rearward pull applied either to the hook directly, or on the leader, when a fish is caught on a hook.

Still further objects of the present invention are to be found in the novelty residing in the combination of a plug body having a forward end that is beveled and the beveled surface concaved as previously mentioned, and provided centrally with means for connection with a fish line, and which plug is provided at its rearward end with means to which a leader is connected, and has hook sets threaded onto the leader for automatic release from the plug body and travel to the end of the leader incident to a rearward pull produced by a fish being caught by any hook.

In accomplishing these and other objects of the invention, I have provided the improved details of construction, the preferred forms of which are illustrated in the accompanying drawing, wherein—

Fig. 1 is a side view of a fish lure, or plug, embodying the present invention.

Fig. 2 is a longitudinal, central section of the plug, particularly illustrating the shape of the front end surface and the means provided for the releasable suspension of the hook sets from the plug body.

Fig. 3 is a cross sectional detail, taken on line 3—3 in Fig. 2.

Fig. 4 is a cross section of the plug body, as seen on line 4—4 in Fig. 2.

Fig. 5 is a view diagrammatically illustrating the release of the hooks from the plug body when a fish is hooked.

Referring more in detail to the drawing—

The plug body, designated in its entirety by reference numeral 1, preferably would be made of wood, but could be of any other suitable, buoyant, light material, and comprises a single, elongated piece that is tapered from about a medial point to the rearward end, and terminates in a point; the plug being of greatest diameter about one-third the distance back from the forward end, and has what might be referred to as a "cigar shape." At any location between the front and rear ends, the plug body is circular in cross section, as indicated by the cross sectional view thereof in Fig. 4. The forward end of the body is cut on a bevel which forms an angle of approximately 50° with reference to the axial line of the plug body, and the slope of the plane of this beveled surface is downwardly and forwardly from the top edge toward the bottom edge of the plug to cause its downward deflection when drawn through the water. The entire forward end surface of the plug is dished or concaved to form the depression designated at 3; this depression being of substantial depth, as will be understood by reference to Figs. 2 and 3.

At the center of the depression 3 that is formed in the forward end surface of the plug, a wire loop or eyelet 4 is fixed in the plug body, and to this eyelet, the fish line, or trolling line, 5 is secured. At the rear end of the plug, a wire loop 6 is fixed, and to this is secured a short line or leader 7, to which the fish hooks are applied, as presently will be explained.

It will here be mentioned that the concaved, or dished forward end surface 3 of the plug body has no portion that offers any obstruction to the flow of water upwardly across it, and there is no portion or part that overhangs any other portion of the beveled surface. By reason of the slope of the bevel and the direction of the concaved surface, the plug will be downwardly deflected in the water when drawn by the line, and will normally assume a position approximating that shown in Fig. 1, by reason of suspension of the fish hooks therefrom.

Formed in the under side of the plug body, at spaced intervals in its longitudinal direction, are two sockets 10, and fixed in the plug body, just forwardly of each socket, is a wire 11 having a free end portion 12 extended rearwardly, and diametrically across the adjacent socket entrance, and terminating just within the rear edge of the socket. These free end portions 12 are downwardly, then upwardly curved, to form a sort of supporting hook, or prong adapted for insertion into the shank eyelet of a set of fish hooks to support the hooks releasably from the plug, and these hook forming portions have sufficient resiliency that they may be sprung downwardly from the sockets, for example, toward the dotted line position 12x illustrated in Fig. 2, thus to provide for release of the fish hooks from the plug body.

In the present instance, I employ two sets or groups of fish hooks, which are designated each by reference numeral 13; each set of hooks comprising three barbs with shanks 13' secured together, and equipped at the upper end of the group of shanks with a suspending loop or eyelet 14. One group of fish hooks is suspended from each hook or prong 12, and it will be understood, by reference to Fig. 2, that the relationship of the prong 12 to the socket 10 and the circular formation of the loop 14 on the fish hook shank provides that, by tilting the group of hooks to the position shown in dotted lines at 13a in Fig. 2, the shank eyelet can be applied to the socket 10, and over the suspending prong 12. Then, when the hooks swing downwardly and rearwardly, they will be retained against displacement from the supporting prong and will only be released by a downward and rearward pull that will spring the prong slightly downwardly and out of the socket sufficient for the eyelet 14 to slip off.

In the present instance, the leader 7, which is secured at one end to the rear end of the plug body, is threaded forwardly through the hook shank eyelets 14 of the rear group of hooks, and is secured to the eyelet of the forward group of hooks. In the event that more than two groups of hooks should be employed on a plug body, the leader would likewise be secured at its end to the forward set of hooks after being threaded in succession through the rearward sets. It is not anticipated, however, that more than two groups or sets of hooks will be employed on a plug.

When the plug is in use, as in trolling, it assumes a position similar to that in which it is shown in Fig. 1, with the hook sets suspended from the under side as illustrated. Should a fish strike the lure and become caught on any one of the hooks, all hooks will be pulled free from the plug body, and will slide down the leader to its end, where they will be retained. With the line drawn tight, the leader will assume the extended position as illustrated in Fig. 5, with the plug somewhat in advance of the fish, thus avoiding the possibility of the line becoming fouled in any way.

The particular advantages in the use of the present plug are due to the beveled and concaved formation of the forward end of the plug, and the fact that the groups of hooks are releasably suspended from the plug body and are threaded onto the leader in such manner that when a fish is caught, all sets of hooks will be pulled from the plug body, and will be caused to assume a position at the end of the extended leader.

Having thus described my invention, what I claim as new therein and desire to secure by Letters Patent is—

1. A fish lure comprising a body, equipped with means at its forward end for attachment to a fish line, and having a socket formed in its under side rearwardly of the means for connection of the line, a hook supporting means fixed to the body and having a yieldable prong extended in the rearward, longitudinal direction of the body, and having its free end terminating within the socket and a fish hook having its shank eyelet applied over said prong to functionally suspend the hook from the body, and normally retained on the prong by contact with the walls of the socket and a leader fixed to the rear end of the body and having holding connection with the hook for the release of the shank eyelet from said prong by rearward pull on the hook and downward deflection of the prong.

2. A fish lure comprising an elongated, rearwardly tapered body, equipped at its forward end for attachment to a fish line, and having a plurality of sockets formed in its under side and spaced apart in its longitudinal direction, a yieldable hook member fixed in the body forwardly of each socket, and extended rearwardly thereacross, a set of fish hooks associated with each socket and having a mounting shank formed with an eyelet in which the yieldable hook member is inserted to functionally suspend the hook set from the body, and a leader fixed to the rear end of the plug and threaded through the eyelets of the hook sets and having fixed connection with the eyelet of the forward set of hooks; said hooks being releasable from the yieldable supporting hooks by rearward pulling forces applied to the hooks or the leader.

3. A fish lure comprising a body equipped at its forward end with means for connection with a line and having a socket formed in the body wall, a yieldable prong fixed in the body and having a free end terminating within the socket, and a fish hook having flexible means attaching it to the body and having a shank eyelet adapted to be applied over the free end of the prong for suspending the hook from the body; said hook being adapted to be released from the prong by pull on the hook, which deflects the prong outwardly from the socket.

DORA ROSEGARD.